Figure 1:
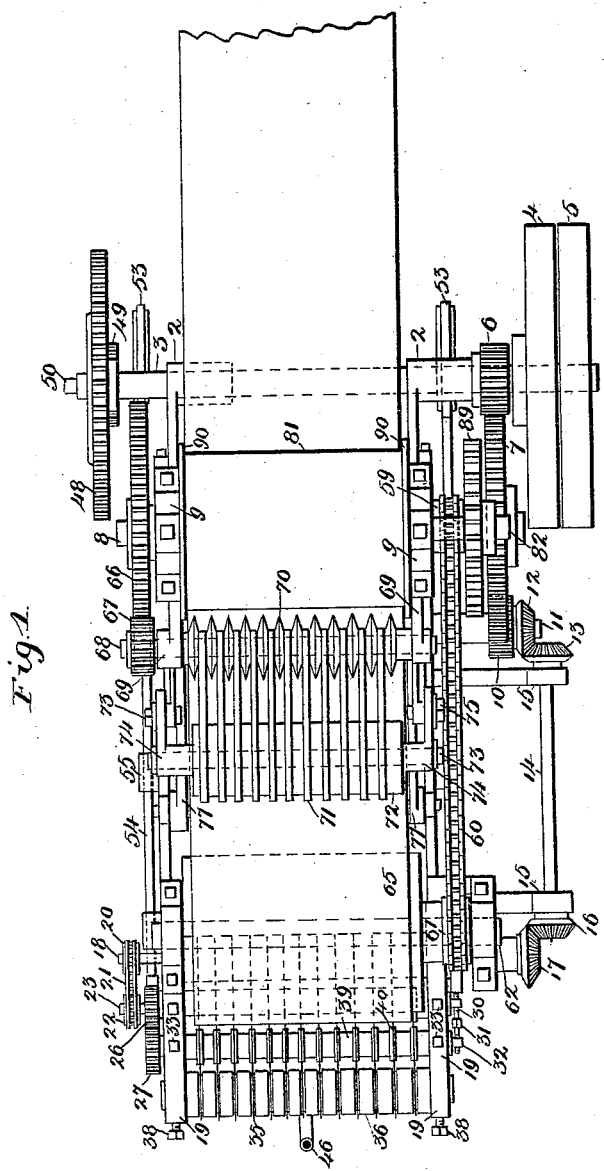

(No Model.) 4 Sheets—Sheet 1.
J. J. PFENNINGER.
MACHINE FOR CUTTING DOUGH.

No. 543,504. Patented July 30, 1895.

Witnesses
Inventor
J. J. Pfenninger.
By his Attorneys, (No Model.) 4 Sheets—Sheet 2.
J. J. PFENNINGER.
MACHINE FOR CUTTING DOUGH.
No. 543,504. Patented July 30, 1895.
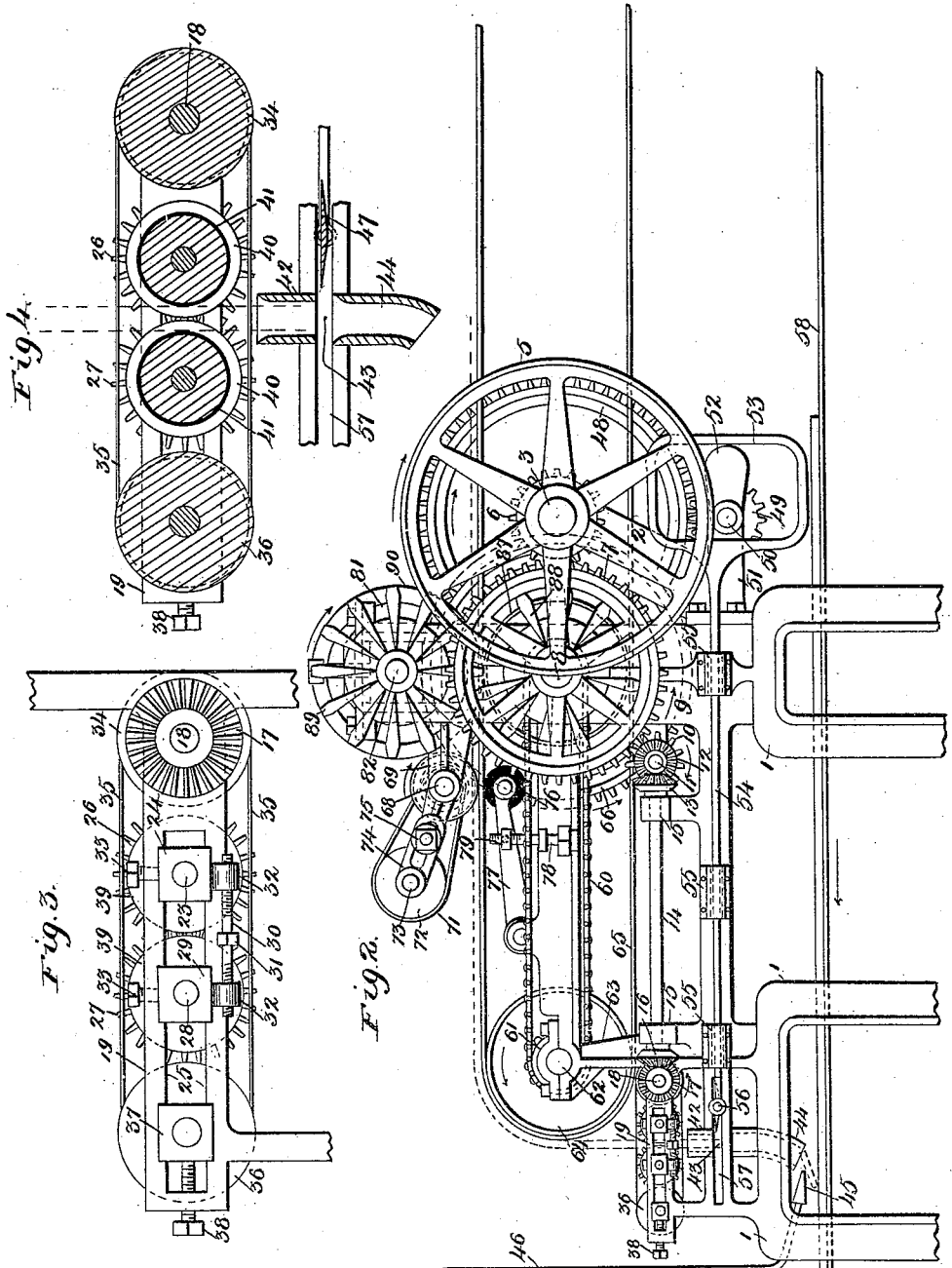
Witnesses
Inventor
J. J. Pfenninger.
By his Attorneys
Keller & Stanek

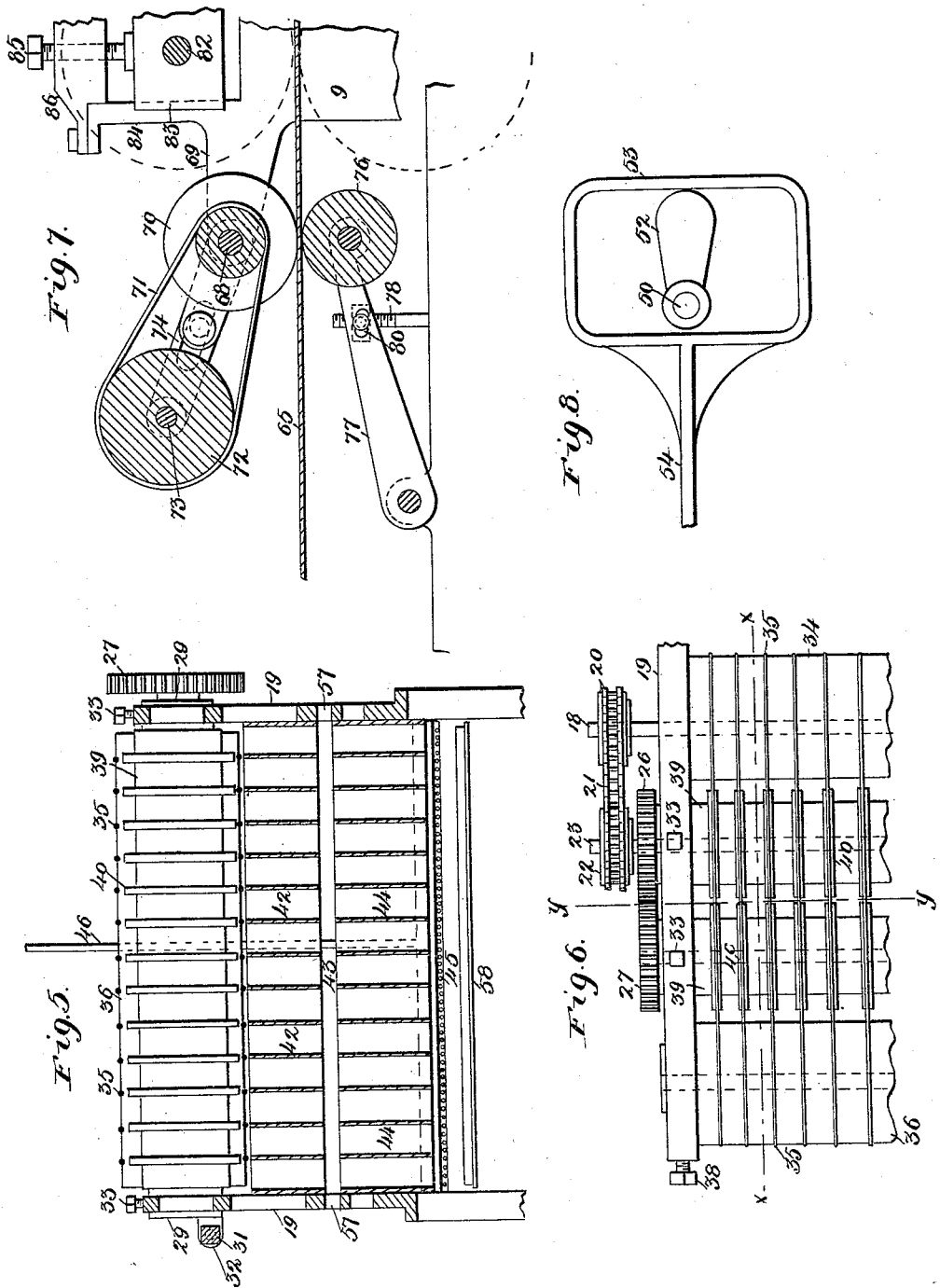

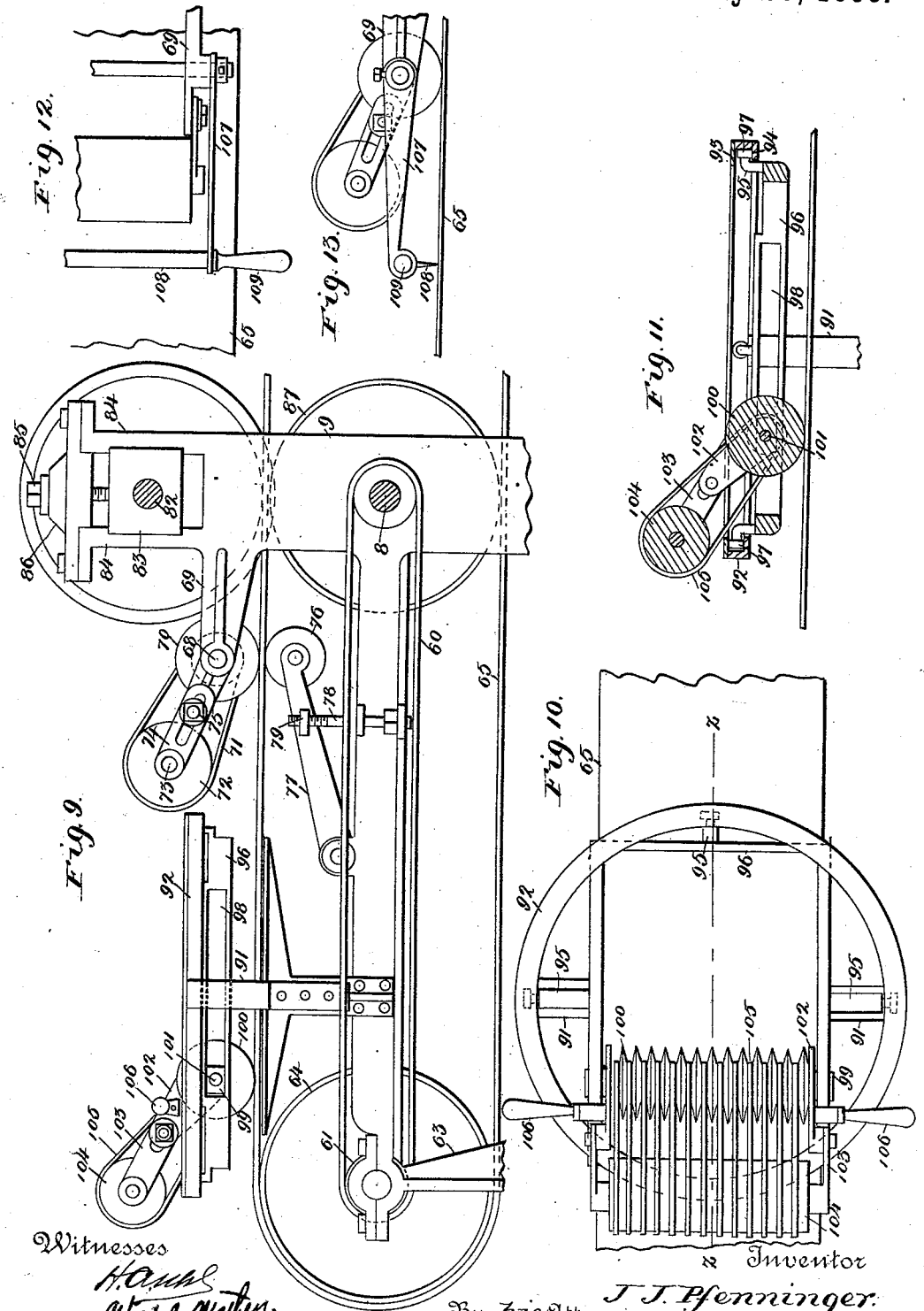

UNITED STATES PATENT OFFICE.

JOHN JACOB PFENNINGER, OF ST. LOUIS, MISSOURI.

MACHINE FOR CUTTING DOUGH.

SPECIFICATION forming part of Letters Patent No. 543,504, dated July 30, 1895.

Application filed April 8, 1895. Serial No. 544,885. (No model.)

*To all whom it may concern:*

Be it known that I, JOHN JACOB PFEN-NINGER, a citizen of the United States, residing at St. Louis, State of Missouri, have invented certain new and useful Improvements in Machines for Cutting Dough, of which the following is a full, clear, and exact description, reference being had to the accompanying drawings, forming a part hereof.

My invention has relation to improvements in dough cutting and distributing machines; and it consists in the novel arrangement and combination of parts more fully set forth in the specification and pointed out in the claims.

In the drawings, Figure 1 is a plan view of my machine. Fig. 2 is a side elevation of the same. Fig. 3 is an enlarged side view of the flanged cylinders leading to the cutting-knife. Fig. 4 is a sectional vertical elevation of the same taken on the line $x\ x$ of Fig. 6. Fig. 5 is a vertical end section taken on line $y\ y$ of Fig. 6. Fig. 6 is an enlarged plan view of one end of the flanged cylinders shown in Fig. 3 and the thread-carrying cylinders on either side thereof. Fig. 7 is a detail elevation of the cutting-disk cylinder and the supporting-cylinder for the belt-lap. Fig. 8 is an enlarged side view of the expanded ring at one end of the arm reciprocating the cutting-knife, showing also the rotating arm which operates within the ring. Fig. 9 is a view similar to Fig. 7, showing the additional hand-operated rotatable cutting-disk cylinder mounted on the frame. Fig. 10 is a plan view of the rotatable cutting-disk cylinder. Fig. 11 is a section on line $z\ z$ of Fig. 10. Fig. 12 is a plan of a modified form of that shown in Fig. 7, showing the addition of a hand-operated knife running transverse to the general direction of the feed-belt; and Fig. 13 is a side elevation of the same.

The object of my invention is to construct a dough cutting and distributing machine for rolling dough into sheets, cutting the said sheets into any desirable shape and size, and finally delivering the resulting product to any convenient point for purposes of baking.

It consists in general of a traveling endless belt on which the dough can be placed and rolled into sheets, a series of cutters superposed over the dough carried on the belt, whereby a series of strips is formed, a suitable knife for cutting such strips into blocks of any desirable form and dimensions, suitable deflecting belts for preventing the dough from sticking to the cutters, suitable separating bands or threads for keeping the strips apart and preventing their lateral adhesion, a suitable steam-spray for moistening the resulting product, and a carrier to deliver the blocks to any convenient point for baking or in proximity to a suitable oven.

It consists, too, of certain modifications whereby the strips can be cut into pieces of variable dimensions or design.

In detail, the machine may be described as follows:

Referring to the drawings, 1 represents a frame within suitable bearings 2, in which is mounted the main driving-shaft 3, carrying the fixed driving-pulley 4 and loose pulley 5 at one end thereof. That end of the shaft adjacent to the pulleys carries a pinion 6, which is adapted to mesh with a gear-wheel 7 on a shaft 8 mounted in the uprights 9 of the frame. This gear-wheel 7 meshes with a pinion 10 on a transverse shaft 11, whose outer end on the same side of the frame carries a bevel-pinion 12, said pinion in turn meshing with the terminal pinion 13 mounted on a longitudinal shaft 14 rotating in the bearings 15. The rear end of the longitudinal shaft 14 carries a pinion 16, which in turn meshes with the terminal pinion 17 on a rear transverse shaft 18, having bearings in suitable rear standards 19 at the end of the machine. The opposite end of the shaft 18 carries a sprocket-wheel 20, from which a sprocket-chain 21 passes over a second and similar sprocket-wheel 22 at the outer end of a shaft 23 having longitudinally-movable bearings 24 confined in the guide-slot 25 in the upper portion of the standards 19. The shaft 23 carries a pinion 26 adjacent to the terminal sprocket-wheel 22, said pinion meshing with a like pinion 27 secured on the adjacent parallel shaft 28, mounted also in an adjustable bearing 29 in the same guide-slot 25, the two bearings, and hence the two shafts, being adapted to be adjusted to and from each other by the right and left screw-threaded ends of a bar 30 operated by a nut 31, the screw-threaded ends operating within the extensions 32 of each bearing. (See Fig. 3.)

When once adjusted the bearings are secured by the screw-threaded bolts 33, as best seen in said figure. On the shaft 18 and between the slotted sides of the standards 19 is secured a cylinder 34, over which pass in suitable depressions for their reception a series of separating-threads 35, the said threads passing over a second and similar cylinder 36, whose shaft is mounted in the adjustable bearings 37 in the guide-slot 25 of the standards 19, the tension of the threads being regulated by adjusting the position of the bearings by means of the adjusting-screws 38 passed through the end of each standard 19. The parallel shafts 23 and 28 each carry a flanged cylinder 39, whose flanges 40 are in line with one another and with the superposed threads 35 passing over the cylinders 34 and 36. Between the flanges 40 is interposed a band of rubber or like material 41, for a purpose to be hereinafter described, it being remembered that the object of a slight adjustment between the cylinders 39 is to accommodate variable thicknesses of dough strips entering between them.

The operation of the parts thus far described can be easily understood from the several connections by following the arrows in Fig. 2, which indicate the relative direction of the motion imparted to the several parts. Motion is imparted to the drive-pulley 4 from any suitable source of power, driving the said pulley in the direction indicated by the arrow in said figure. From the connections, as shown, motion will be imparted to the shaft 8 and consequently to the cylinder 34, as indicated by the arrows in Fig. 2, which by the sprocket connection at the opposite end thereof will drive the shaft 23 in the same direction, which in turn, by reason of the coupling of the pinions 26 and 27, will drive the upper surfaces of the flanged cylinders 39 toward each other, the cylinders 34 and 36 connected by the separating-threads being driven, of course, in the same direction. It is obvious that strips of dough entering between the cylinders 39 and of a width determined by the distance between the flanges 40 and threads 35 will be kept apart and prevented from sticking by reason of the separating-threads superposed over the flanges between which the dough strips are received from the feeding and cutting mechanism. The rings of rubber 41 keep the dough from sticking to the cylinders. As the strips of dough are thus delivered or fed outwardly by the parts thus far described the several strips each pass through a pocket 42, below which and separated by a space 43 are a series of corresponding delivery-tubes 44 curved outwardly, the delivery end of said tubes having disposed in proximity thereto a water and steam spray-pipe 45, supplied with steam and water through a supply-pipe 46 leading from any suitable steam-generator. As the dough strips thus pass through the pockets 42 and before they enter the tubes 44 the same are cut into any desirable lengths by a transverse knife 47 reciprocating within the space 43, the operation of which is now to be described.

Mounted on the main shaft 3 at the end opposite that carrying the pulleys 4 and 5 is a gear-wheel 48, which meshes with a pinion 49, carried by a shaft 50, having bearings in the brackets 51. To the shaft 50 and on either side of the machine are secured the arms 52, having rounded ends. Rotation is thus imparted to the shaft 50, and consequently to the arms 52. As the latter are thus rotated, they simultaneously and intermittently strike the opposite inner sides of the oblong or rectangular expanded band or ring 53 at the end of the reciprocating bars 54, guided and supported in suitable bearings 55 on the side of the frame, the free opposite ends of the bars 54 carrying the knife 47, whose opposite bearings 56 are guided within the slots 57 of the standards 19. It is thus apparent, therefore, that as the arms 52 rotate they will alternately come in contact with the lateral adjacent sides of the oblong ring 53, reciprocating thus the bars 54, of which they form a part, and consequently reciprocate the knife carried by the free ends of the bars 54. The knife in its reciprocating movements cuts the dough strips into proper lengths before they enter the delivery-tubes 44, above referred to. As the dough is delivered from the tubes, it drops on a traveling belt 58 and is carried to any suitable delivery point or to a bake-oven. The dough being moistened does not adhere to the belt when occasion arises to remove it from said belt.

I will now describe the mechanism which rotates the main belt on which the dough is spread and on which it is cut into longitudinal strips, as referred to above. Mounted on the shaft 8, adjacent to the gear 7, is a sprocket-wheel 59, over which passes a sprocket-chain 60, passing over a second sprocket-wheel 61, carried by a shaft 62, having its bearings in the posts 63. The shaft 62 carries a cylinder or drum 64, over which the main feed-belt 65 passes, the opposite end passing over an idle-pulley. (Not shown.) The arrows in Fig. 2 and the particular connection of parts will easily explain the motion of the main feed-belt 65.

It is now in order to explain the mechanism by which the dough on the belt 65 is formed into sheets and how the latter are cut into the longitudinal strips fed to the flanged cylinders 39. Mounted on the opposite end of the shaft 8 is a gear-wheel 66, meshing with a pinion 67 at the end of a shaft 68, which has its bearings in the projecting arms 69 on either side of the frame. The shaft 68 carries a series of annular cutting-disks 70, between which and over the shaft revolve the series of deflecting belt-strips 71, passing over an idle cylindrical pulley 72 on a shaft 73, whose ends are mounted in bearings in the adjustable extensions 74, said extensions being slotted and adjustable by means of the bolts 75, which secure them to the arms 69. In this manner the belt-strips 71 can always be kept taut. The purpose of the strips 71 is to always deflect the dough away from between the cutting-disks, as the dough strips cut by the cutting disks would have a tendency to stick to the shaft on which they are mounted, as well as to the sides of the cutting-disks.

From the construction described and from the arrows shown in Fig. 2 the motion of the cutting-disks is obvious, and it is further evident that the sheet-dough on the belt 65 will be cut into suitable longitudinal strips by the cutting-disks 70, the strips so cut being delivered by the belt to the cylinders 39, from which the dough passes, and is cut as already explained.

Immediately under the cutting-disks 70 and on the opposite side of the belt 65 is a yielding supporting-cylinder 76, affording a suitable supporting-surface for the said belt and disks, the said cylinder being mounted in suitable bearings at the free ends of the arms 77 pivoted to the frame of the machine, and being slightly adjustable by a screw-threaded bolt 78, operating within a lug 79 loosely working in a slot 80 in each arm. The dough is formed into sheets on the belt 65 before it reaches the cutting-disks 70 by passing under a compression-cylinder 81 mounted on a shaft 82, whose bearings 83 are made vertically adjustable between the terminal arms 84 of the uprights 9, the adjustment being effected by a screw-threaded bolt 85 passing through the cap-piece 86. The compression-cylinder 81 has a co-operating-cylinder 87 on the opposite side of the upper lap of the belt 65, the lower lap passing under said cylinder 87 after it leaves the terminal or delivery cylinder 64. The cylinders 81 and 87 do not run by frictional contact, but the yielding compression-cylinder 81 is driven positively from the cylinder 87, which is mounted on the shaft 8. This positive connection is effected by the finger-gearing, as follows: At one end of the shaft 8, and between the gear 7 and sprocket-chain 60 on one side of the machine, is fixed a finger-gear wheel 88, which meshes with a corresponding finger-gear wheel 89 mounted on the corresponding end of the shaft 82, so that the cylinders mounted on the corresponding shafts with the finger-gear wheels are driven positively, the compression-cylinder 81 having terminal flanges 90 to better guide the lap of the belt 65 and the sheet-dough spread upon it.

The foregoing describes the construction shown in Figs. 1 to 8 inclusive. Under certain conditions, however, it may be desirable to cut the dough strips, after they leave the cutting-disks, into other forms than those resulting from the operation of the reciprocating knife 47.

In Fig. 9, I have shown mounted on suitable supporting-posts 91 projecting from and secured to the frame on either side of the terminal lap of the belt 65 a ring 92, having upper and lower flanges 93 and 94, respectively, and from the groove or guide-way thus formed between the flanges there depends, by means of suitable arms 95, a rectangular frame 96, the ends of the arms 95 carrying antifriction-rollers 97, by which the depending frame can be bodily rotated within the ring 92. Two opposite sides of the rectangular frame have longitudinal parallel slots 98, within which are adapted to slide the bearings 99 of the cutting-cylinder 100, supported on suitable trunnions 101 within said bearings, the cutting-cylinder having a series of cutting-disks similar to the disks 70. From the bearings 99 extend upward supporting-arms 102, and to the ends of said arms are secured the extension arms 103, whose free ends carry between them the cylinder 104, over which are adapted to pass the deflecting belts 105, a construction identical with the belts 71 and the cylinder 72, over which they pass. On either side of the arms 102 is secured a handle 106. The cylinder 100 is operated by hand similarly to a rolling-pin, and it is obvious that when the handles 106 are seized the cylinder can be pushed back and forth on its bearings within the slots 98 of the frame, and that the resulting pieces cut from the dough strips leaving the cutting-disks 70 will vary according to the position or angle to which the frame 96 is turned with relation to the general direction of said strips.

Where the modification shown in Figs. 9 to 11 is used, of course the knife 47 is dispensed with, the resulting pieces being taken up or delivered from under the frame 96 by a suitable belt. (Not shown).

In Figs. 12 and 13, I have shown a modification wherein to the sides of the arms 69 are pivoted the arms 107, carrying between their ends a knife 108, outwardly provided with handles 109, by which arrangement the pieces, after being subjected to the cutting action of the disks 70, can be further dissected by a single operation of the terminal knife 108.

Having described my invention, what I claim is—

1. In a dough cutting machine, a suitable feed belt, compression rollers for pressing the dough into sheets, suitable cutting disks in the path of said belt for cutting the dough into strips, suitable driving mechanism for said disks, an adjustable cylindrical pulley, deflecting belts passing between said disks and over said pulley, and suitable cutters for cutting said strips of dough into suitable lengths, substantially as set forth.

2. In a dough cutting machine, a suitable feed belt, positively driven compression cylinders interposed in the path of the belt on opposite sides of one lap thereof, a series of cutting disks for cutting the sheets resulting from the action of the cylinders into strips, deflecting belts co-operating with said cutting disks, flanged cylinders for directing the strips, a series of pockets for said strips, a reciprocating knife for cutting the strips into suitable lengths, suitable means for guiding the resulting pieces, and a delivery belt for conveying off the final pieces, substantially as set forth.

3. In a dough cutting machine, a suitable feed belt, suitable compression cylinders co-operating with said belt for spreading the dough into sheets, a series of cutting disks for cutting the sheets into strips, deflecting belts co-operating with said cutting disks, flanged cylinders for receiving the said strips, and a series of separating threads co-operating with said flanged cylinders, substantialy as set forth.

4. In a dough cutting machine, a suitable frame, a main drive shaft, a pinion on said shaft, a second shaft adjacent to the main shaft, a gear wheel on said second shaft meshing with the pinion on the drive shaft, mechanism for rolling the dough into sheets and cutting the latter into strips, suitable flanged cylinders for the reception of the strips, intermediate gear connections between said flanged cylinders and the gear wheel on the second shaft for imparting motion to said cylinders, a sprocket wheel on the second shaft adjacent to the gear wheel, a terminal shaft mounted on said frame, a sprocket wheel on said terminal shaft, a sprocket chain connecting the two sprocket wheels, a delivery cylinder on the terminal shaft, and a feed belt passing over the same for feeding the strips to the flanged cylinders, substantially as set forth.

5. In a dough cutting machine, a suitable frame, a main drive shaft, a second shaft mounted on said frame, a cylinder on said second shaft, intermediate gearing between the two shafts, finger gears on said second shaft, a shaft superposed over the second shaft, a compression cylinder on said superposed shaft, finger gears secured to the shaft carrying the compression cylinder meshing with the finger gears of the lower shaft, a feed belt adapted to pass between the two cylinders, and suitable cutting devices for cutting the dough after it leaves the compression cylinders, substantially as set forth.

6. In a dough cutting machine, a suitable feed belt, compression cylinders for spreading the dough thereon into sheets, cutting devices for cutting said sheets into strips, deflecting belts in connection with said cutting devices, suitable flanged cylinders for receiving said strips, a cutting knife in the path of said strips, mechanism for reciprocating said knife, a series of guide tubes for the resulting pieces, and a delivery belt for carrying the pieces to a suitable point, substantially as set forth.

7. In a dough cutting machine, a suitable frame, a main drive shaft, a gear wheel carried by the same, a second shaft mounted under the drive shaft, a pinion on said second shaft, outwardly projecting arms secured to said second shaft, reciprocating bars mounted in suitable bearings on either side of the frame, an expanded ring carried by each of said bars and embracing the arms carried by the second shaft, a knife secured between the opposite ends of said bars, and a suitable guide for said knife, the bars and knife being adapted to be reciprocated by the revolution of the shaft carrying the arms, substantially as set forth.

8. In a dough cutting machine, suitable revolving cylinders adjacently mounted to one another, means for feeding strips of dough to the same, an exterior cylinder mounted on either side of the first named cylinders, and suitable threads passing over the outer pair of cylinders and revolving about the inner cylinders, substantially as set forth.

9. In a dough cutting machine, suitable revolving flanged cylinders, bands of rubber or like material interposed between the flanges, means for feeding strips of dough to the cylinders between said flanges, a cylinder disposed exteriorly on either side of the flanged cylinders said exterior cylinders having a series of peripheral depressions in line with the flanges of the inner cylinders, separating threads passed over the cylinders and confined within the depressions, adjustable bearings for the several cylinders, the said dough strips passing between the threads and separated by the same, substantially as set forth.

10. In a dough cutting machine, a suitable cylinder having disposed thereon a series of cutting disks, a shaft for said cylinder, deflecting belts passed around said cylinder between the disks, an idle pulley for said deflecting belts, means for adjusting the bearings for said pulley, and suitable gearing for imparting motion to the cutting disks, substantially as set forth.

11. In a dough cutting machine, a suitable frame, dough-feeding mechanism for the same, suitable cutting devices for cutting said dough into strips, a rotating frame mounted on the main frame and cutting devices carried by the rotating frame for dissecting the strips into any convenient form, substantially as set forth.

12. In a dough cutting machine, a suitable machine frame, a ring mounted at one end thereof, guide-ways along the periphery of said ring, a frame suspended from the ring and adapted to rotate within the guide-ways, slotted guides along opposite sides of the rotating frame, movable bearings within said slots, cutting disks carried by said bearings, and an operating handle for shifting the cutting disks within the slots and rotating the same simultaneously, substantially as set forth.

In testimony whereof I affix my signature in presence of two witnesses.

JOHN JACOB PFENNINGER.

Witnesses:
  H. A. UHL,
  EMIL STAREK.